(12) United States Patent
Janssen

(10) Patent No.: US 8,363,291 B2
(45) Date of Patent: Jan. 29, 2013

(54) SCANNING METHOD AND DEVICE FOR OBTAINING GREY SCALE IMAGES

(75) Inventor: Johannes H. M. Janssen, Velden (NL)

(73) Assignee: OCE Technologies B.V., Venlo (NL)

( * ) Notice: Subject to any disclaimer, the term of this patent is extended or adjusted under 35 U.S.C. 154(b) by 0 days.

(21) Appl. No.: 13/268,391

(22) Filed: Oct. 7, 2011

(65) Prior Publication Data

US 2012/0086992 A1 Apr. 12, 2012

Related U.S. Application Data

(63) Continuation of application No. PCT/EP2010/054564, filed on Apr. 7, 2010.

(30) Foreign Application Priority Data

Apr. 9, 2009 (EP) ..................................... 09157725

(51) Int. Cl.
 *H04N 1/04* (2006.01)
(52) U.S. Cl. ......... 358/513; 358/512; 358/514; 358/474
(58) Field of Classification Search .................. 358/513, 358/512, 514, 474

See application file for complete search history.

(56) References Cited

U.S. PATENT DOCUMENTS

| 6,046,829 | A | * | 4/2000 | Noda ............................. 358/513 |
| 6,717,617 | B1 | | 4/2004 | Ozono |
| 2003/0202108 | A1 | | 10/2003 | Maeda |

FOREIGN PATENT DOCUMENTS

WO  WO 2007/062679 A1  6/2007

* cited by examiner

*Primary Examiner* — Houshang Safaipour

(74) *Attorney, Agent, or Firm* — Birch, Stewart, Kolasch & Birch, LLP

(57) ABSTRACT

In a method of scanning an image on an original, an optical sensor including sensor elements for each of a number of basic colors is used to generate pixel values of rows of pixels of the scanned image. The sensor elements are used to generate grey scale pixel values representing different parts of the image. A first sensor element for each of the basic colors is used to generate pixel values of odd pixels of rows on the original, and a second sensor element for each of the basic colors is used to generate pixel values of even pixels of rows of the original. Each grey scale pixel value is generated mainly on the basis of a pixel value of at least one of the first sensor elements and a pixel value of at least one of the second sensor elements for adjacent pixels.

10 Claims, 8 Drawing Sheets

| row# | O | E |
|---|---|---|
| 1 | R -13 | B -8 |
| 2 | G -7 | R -14 |
| 3 | B -1 | G -8 |
| 4 | R -12 | B -2 |
| 5 | G -6 | R -13 |
| 6 | B 0 | G -7 |
| 7 | R -11 | B -1 |
| 8 | G -5 | R -12 |
| 9 | B 1 | G -6 |
| 10 | R -10 | B 0 |
| 11 | G -4 | R -11 |
| 12 | B 2 | G -5 |
| 13 | R -9 | B 1 |
| 14 | G -3 | R -10 |
| 15 | B 3 | G -4 |
| 16 | R -8 | B 2 |
| 17 | G -2 | R -9 |
| 18 | B 4 | G -3 |
| 19 | R -7 | B 3 |
| 20 | G -1 | R -8 |
| 21 | B 5 | G -2 |
| 22 | R -6 | B 4 |
| 23 | G 0 | R -7 |
| 24 | B 6 | G -1 |
| 25 | R -5 | B 5 |
| . | G 1 | R -6 |
| . | B 7 | G 0 |
| . | R -4 | B 6 |
| | G 2 | R -5 |
| | B 8 | G 1 |
| | R -3 | B 7 |
| | G 3 | R -4 |
| | B 9 | G 2 |
| | R -2 | B 8 |

Fig. 6A

| G 4 | R -3 |
|---|---|
| B 10 | G 3 |
| R -1 | B 9 |
| G 5 | R -2 |
| B 11 | G 4 |
| R 0 | B 10 |
| G 6 | R -1 |
| B 12 | G 5 |
| R 1 | B 11 |
| G 7 | R 0 |
| B 13 | G 6 |
| R 2 | B 12 |
| G 8 | R 1 |
| B 14 | G 7 |
| R 3 | B 13 |
| G 9 | R 2 |
| B 15 | G 8 |
| R 4 | B 14 |
| G 10 | R 3 |
| B 16 | G 9 |
| R 5 | B 15 |
| G 11 | R 4 |

Fig. 6B

SCANNING METHOD AND DEVICE FOR OBTAINING GREY SCALE IMAGES

CROSS-REFERENCE TO RELATED APPLICATIONS

This application is a Continuation of International Application No. PCT/EP2010/054564, filed on Apr. 7, 2010, and for which priority is claimed under 35 U.S.C. §120, and which claims priority under 35 U.S.C. §119 to Application No. 09157725.4, filed on Apr. 9, 2009. The entirety of each of the above-identified applications is expressly incorporated herein by reference.

BACKGROUND OF THE INVENTION

1. Field of the Invention

The present invention relates to the field of scanning. More specifically, the present invention relates to a method of scanning an image, and a scanning device arranged to perform the method of scanning In a scanning device of the present invention, an optical sensor is provided comprising sensor elements for each of a number of basic colors to generate pixel values of a scanned image. Each pixel value represents an optical density of a pixel of the image. In this way, a monochrome, i.e. grey scale or black and white (B/W) image of the original is obtained using a color scanner.

2. Background of the Invention

A scanner usually has a light source emitting white light. In reduction type scanners, an optical sensor with one or more linear CCD (Charge Coupled Device) arrays and a lens are arranged to focus lines of an original onto the CCD line arrays. In contact type scanners, lines of the original are captured onto the CCD line arrays through a lens array.

In a color scanner, for example, there are at least three CCD line arrays having color filters for red (R), green (G), and blue (B) light, respectively, thus forming sensor elements for the basic colors of red, green, and blue light. Typically, the sensor elements for different colors have different light sensitivities. When a grey scale image is to be obtained from a color original, the original is scanned, and the signals from the sensor elements for red, green, and blue light are mathematically mixed or processed in order to calculate the grey scale intensities from the RGB values of each pixel of the image. Hence, the grey scale level of a pixel is a weighted average of the RGB levels, wherein the weight factors are defined such that the hue and saturation information is eliminated. A usual RGB weighing scheme is: grey scale level=$0.3 \cdot R + 0.6 \cdot G + 0.1 \cdot B$.

The scan speed of a reduction type scanner is limited by the maximum clock speed of the CCD. This is a serious limitation in view of a demand for high scan resolutions to be obtained in a shortest possible time.

Reference WO 2007/062679 A1 discloses a high speed scanner and method of scanning an image on an original, wherein an optical sensor comprising sensor elements for each of three basic colors is used to generate pixel values of the scanned image. Each pixel value represents an optical density of a pixel of the image. Each pixel value is generated mainly on the basis of a signal of only one of the sensor elements. Each of the sensor elements for each of the basic colors is used to generate pixel values representing substantially different parts of the image. Accordingly, the amount of pixels to be scanned is divided among the sensor elements for the different basic colors, and the scan speed can be increased up to three times compared to a conventional scan mode wherein each pixel of the original is scanned by three sensor elements. Thus, a color scanner can be used with a high scan speed when only a grey scale or B/W image is needed.

In the scanner and method according to the WO 2007/062679 A1 reference, artifacts due to a repeat frequency of a pattern in the scanned image at one third of the output frequency in a transport direction of the original are produced, requiring a subsequent filtering process to suppress such artifacts.

The image on the original may be a grey scale or B/W image, or may be a color image. In a color image, some colors may not be recognized by the sensor element scanning the colors. For example, a green pixel on the original will not be recognized by a sensor element for color red and a sensor element for color blue. Accordingly, when scanning a green area on the original, artifacts are produced having a spatial frequency corresponding to a repeat length in the scan direction of the image.

SUMMARY OF THE INVENTION

It would be desirable to provide a scanning device and a method of scanning in which a grey scale or B/W image can be obtained from a grey scale or B/W and/or from a color original at high speed, requiring no subsequent filtering process to suppress artifacts as described above.

To better address one or more of these concerns, in a first aspect of the present invention, a method of scanning an image on an original is provided, wherein an optical sensor comprising sensor elements for each of a number of basic colors is used to generate pixel values of rows of pixels of the scanned image, wherein each pixel value represents an optical density of a pixel of the image, and wherein each of the sensor elements for each of the basic colors is used to generate grey scale pixel values representing substantially different parts of the image. A first sensor element for each of the number of basic colors is used to generate pixel values of odd pixels of rows on the original, and a second sensor element for each of the number of basic colors is used to generate pixel values of even pixels of rows of the original. For a pixel, a grey scale pixel value is generated mainly on the basis of a pixel value of at least one of the first sensor elements and a pixel value of at least one of the second sensor elements for adjacent pixels.

For example, the first and second sensor elements are arranged in parallel at slightly different positions along a transport direction, each first or second sensor element scanning a row of pixels on the original simultaneously, where all sensor elements may operate simultaneously. Here, the transport direction is a direction of relative movement of the original and the sensor elements.

In accordance with the present invention, pixel values of odd pixels being in one column of pixels on the original, and pixel values of even pixels being in an adjacent column of pixels on the original are used to generate grey scale pixel values of pixels in either the column of odd pixels or the column of even pixels. In other words, for a scanning of a first pixel using three basic colors, a pixel value of the first pixel is combined with a pixel value of a second pixel and a third pixel situated immediately to the left or the right of the first pixel in a same row of pixels, and/or situated immediately above or below the first pixel in a same column of pixels. Each of the first, second, and third pixel is scanned by a sensor element for a different basic color, thereby assuring that a grey scale value for the first pixel is generated in an optimum way, avoiding or at least reducing artifacts as mentioned above without a filtering being necessary to reduce such artifacts.

In a second aspect, according to the present invention, a scanning device is provided, the scanning device having an optical sensor comprising sensor elements for each of a number of basic colors, the scanning device being adapted to generate pixel values of a scanned image, wherein each pixel value represents an optical density of a pixel of the image. The scanning device is adapted to operate according to the method of the present invention.

In an embodiment, the scanning device may comprise a shutter to control a light integration time of each sensor element.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 illustrates a generation of pixel values in an embodiment of the method of the present invention.

DETAILED DESCRIPTION OF THE PREFERRED EMBODIMENTS

Figure 1:
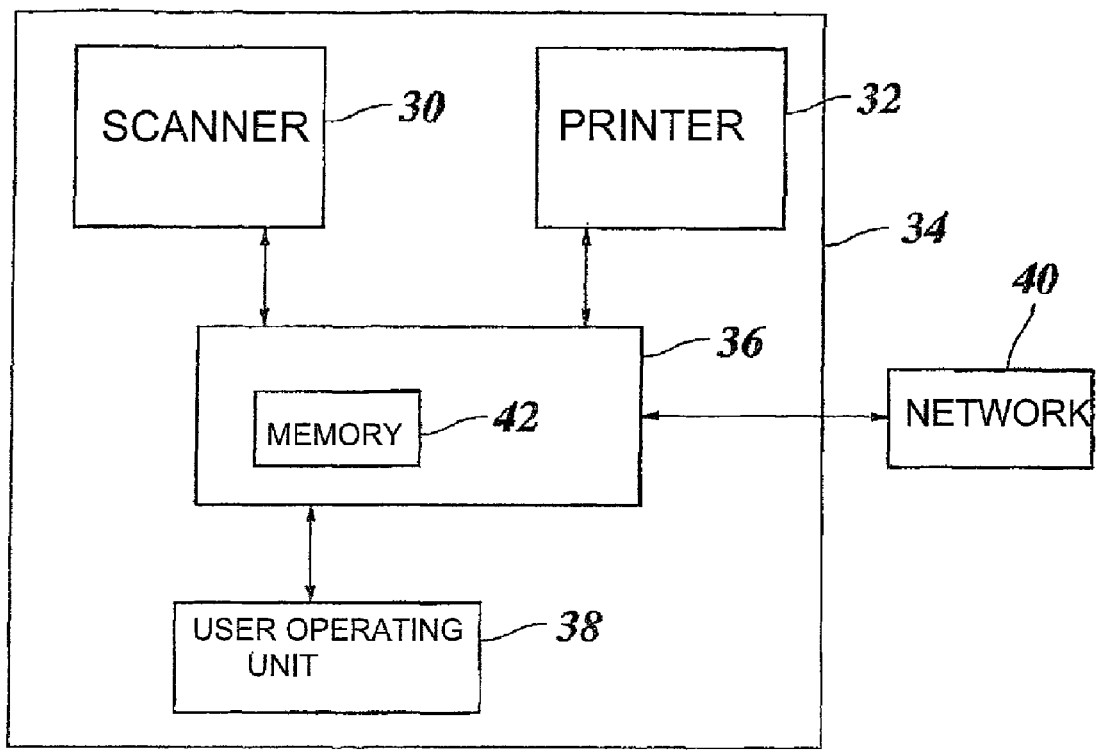
FIG. 1 schematically shows components of a copier including a scanner and a printer.

The present invention will now be described with reference to the accompanying drawings, wherein the same reference numerals have been used to identify the same or similar elements throughout the several views.

FIG. 1 depicts a scanning device or scanner 30 according to the present invention which, together with a printer 32, forms a copier 34. A control unit 36 controls the scanner 30 and the printer 32, and is connected to a user operating unit 38 and an internal or external network, such as network 40. When the scanner 30 reads an original, the scanned image may be transferred to a memory 42 of the control unit 36 and printed by the printer 32, or it may be transferred via the network 40 to, for example, a PC.

Figure 2:
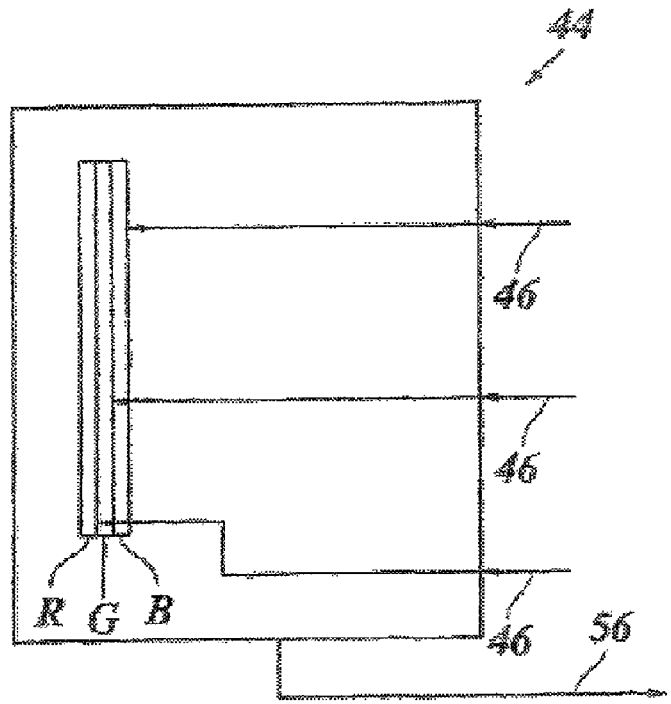
FIG. 2 schematically shows an optical sensor of the scanner.

FIG. 2 shows an optical sensor 44, like a CCD device, of the scanner 30. The sensor 44 has three parallel CCD line arrays of sensor element assemblies R, G, and B, each sensor element assembly having two sensor elements. Clock signals 46 for the CCDs are generated to synchronously scan the sensor elements. The pixel values detected by the optical sensor 44 are output on a signal line 56, and stored in a buffer memory. The buffer memory may input the pixel values to a processor, which processes the input pixel values to generate output grey scale pixel values for printing a grey scale image of the original or otherwise providing a grey scale image. The processor may comprise software containing instructions to perform the processing described in more detail below.

Different configurations for generating clock signals 46 may be applied in a scanner 30 that uses CCD technology.

Figure 3:
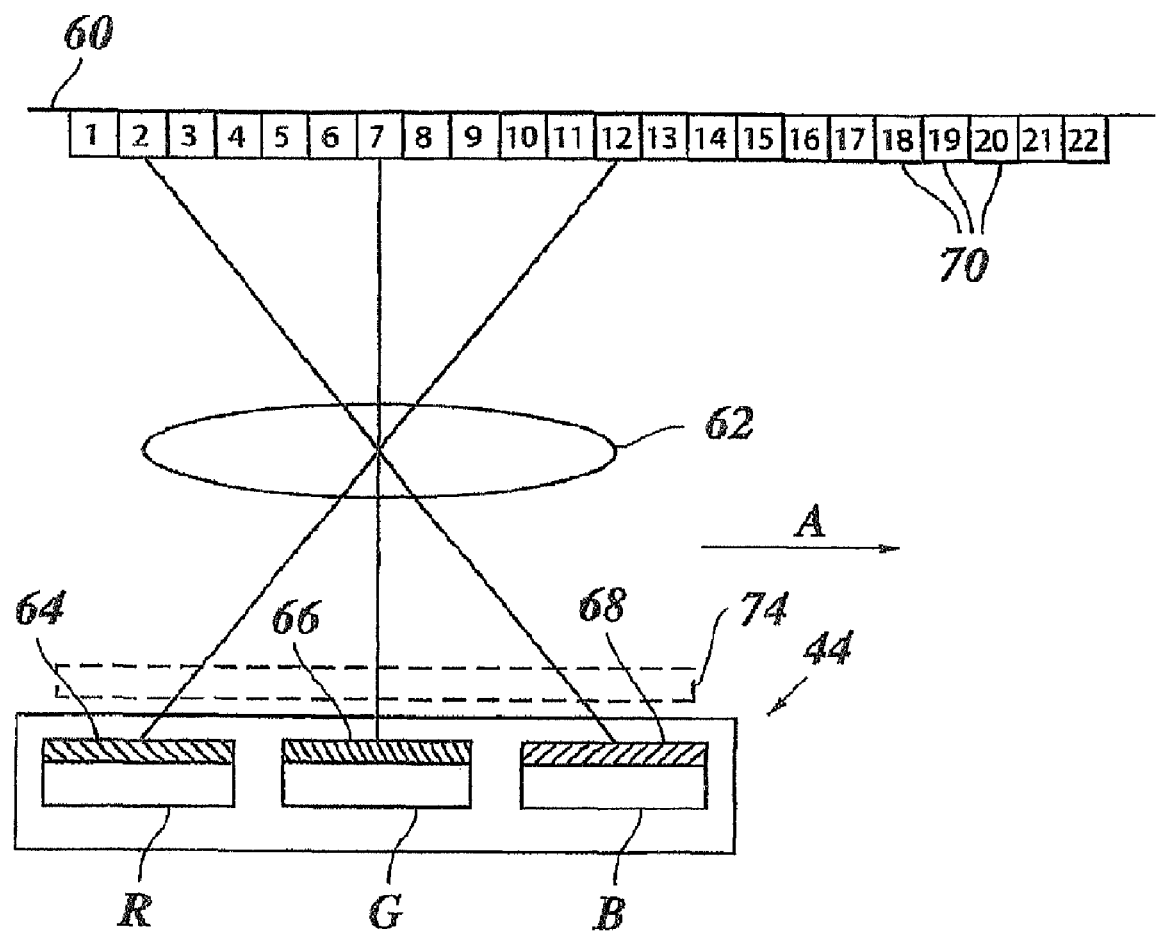
FIG. 3 schematically shows three sensor elements of an optical sensor.

As shown in FIG. 3, the optical sensor may be of the reduction type. Rows (also referred to as lines) of an original 60, which extend perpendicular to the plane of the drawing of FIG. 1, are projected by a lens device 62 onto the arrays of sensor element assemblies R, G, B, which also extend perpendicular to the plane of the drawing of FIG. 1. White light from a light source illuminates the original in a manner known in the art. The sensor element assembly R has a color filter 64 for red light. The sensor element assemblies G and B are equipped with color filters 66 and 68 for green and blue light, respectively. The arrays of sensor element assemblies R, G, B are arranged in parallel, and are focused on different rows of the original 60. FIG. 3 illustrates a column (parallel to the plane of the drawing) of pixels 70 of the original belonging to image rows 1 to 22 (perpendicular to the plane of the drawing).

A scanning procedure will now be explained in conjunction with FIG. 4. During the scanning process, the optical sensor 44 is moved relative to the original 60 in a scan direction A (see also FIG. 3). The sensor element assembly R comprises two sensor elements: a sensor element RO for scanning odd pixels of rows of the scanned image, and a sensor element RE for scanning even pixels of rows of the scanned image. Likewise, the sensor element assembly G comprises two sensor elements: a sensor element GO for scanning odd pixels of rows of the scanned image, and a sensor element GE for scanning even pixels of rows of the scanned image. The sensor element assembly B comprises two sensor elements: a sensor element BO for scanning odd pixels of rows of the scanned image, and a sensor element BE for scanning even pixels of rows of the scanned image. Odd pixels having the same number (e.g. 1, 3, 5, . . . ) in different rows of the scanned image together form a column of odd pixels. Likewise, even pixels having the same number (e.g. 2, 4, 6, . . . ) in different rows of the scanned image together form a column of even pixels.

Figure 4A:
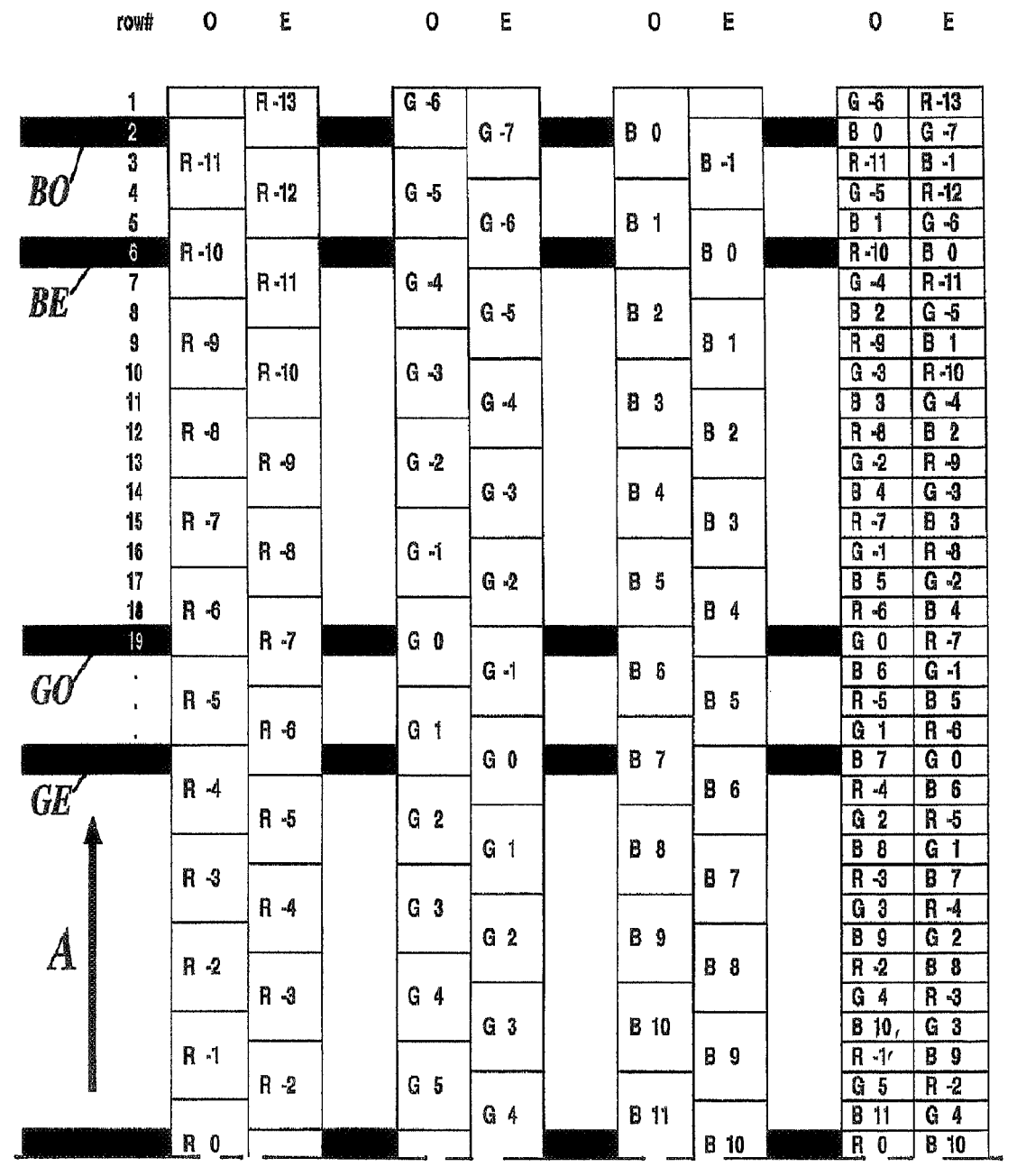
Figure 4B:
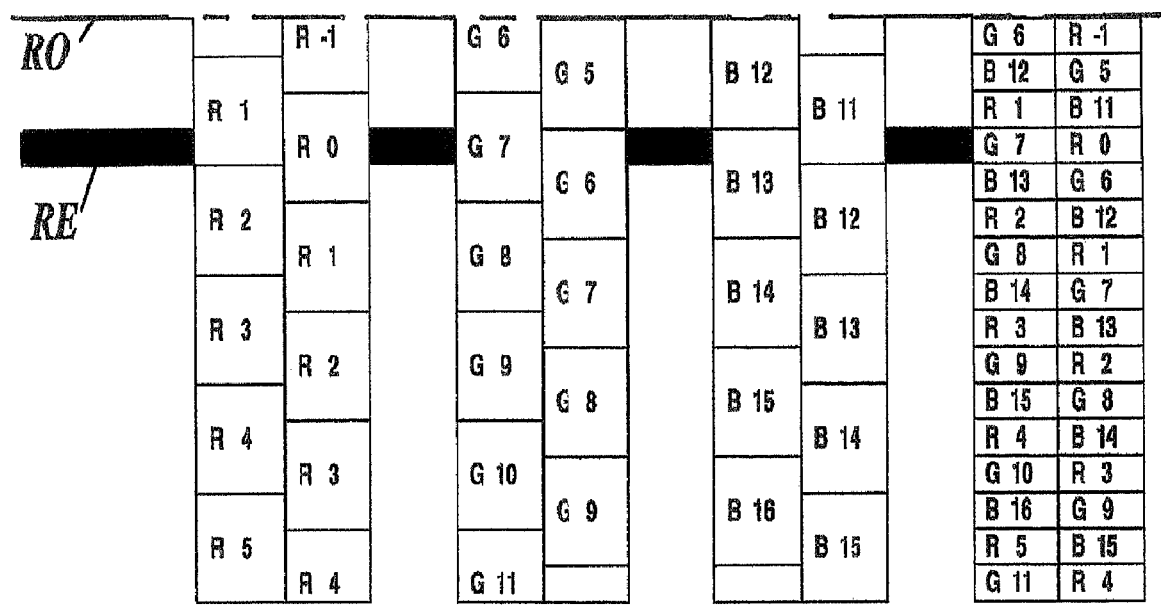
FIG. 4 illustrates a part of a method of scanning in an embodiment of the present invention.

In FIG. 4, at the left-hand side, two columns of odd (O) and adjacent even (E) pixels of lines of the scanned image are shown for successive clock periods (also referred to as cycle times) of the sensor elements RO, and RE, respectively. In FIG. 4, an indication 'Y x' (where Y=R, G, B, and x=integer) means the x-th clock period for basic color Y for sensor elements YO, and YE, respectively. Next, two columns of odd (O) and even (E) pixels of the same lines of the scanned image are shown for the different clock periods of the sensor elements GO, and GE, respectively. For ease of explanation, the pair of columns scanned by sensor elements GO, GE has been drawn next to the pair of columns scanned by sensor elements RO, RE, while in fact these pairs of columns overlie one another since they relate to the same pixel columns Next, two columns of odd (O) and even (E) pixels of the same lines of the scanned image are shown for the different clock periods of the sensor elements BO, and BE. For ease of explanation, the pair of columns scanned by sensor elements BO, BE has been drawn next to the pair of columns scanned by sensor elements GO, GE, while in fact these pairs of columns overlie one another. So, all three columns marked O overlie one another, and all three columns marked E overlie one another.

The operation cycles of the CCDs of the sensor elements RO, RE, GO, GE, BO, and BE are synchronized. In a clock period, the sensor elements pass over three rows of pixels on the original image. The light integration time of the sensor elements within each operation cycle is chosen such that the signals provided by each sensor element are mainly representative for the pixels in the second row of the three rows.

In the pair of columns of odd (O) and even (E) pixels shown at the right-hand side of FIG. 4, as an example, it is illustrated that a pixel value of an odd pixel of a row 6 on the image is generated on the basis of a signal of sensor element RO passing over rows 5, 6, and 7 in clock period −10. Similarly, a pixel value of an even pixel of row 6 on the image is generated on the basis of a signal of sensor element BE passing over rows 5, 6, and 7 in clock period 0. As another example, it is illustrated that a pixel value of an odd pixel of a row 14 on the original image is generated on the basis of a signal of sensor element BO passing over rows 13, 14, and 15 in clock period 4. Similarly, a pixel value of an even pixel of row 14 on the image is generated on the basis of a signal of sensor element GE passing over rows 13, 14, and 15 in clock period −3.

Each pixel on the original image is thus read by only one of the sensor elements RO, RE, GO, GE, BO, BE. Therefore, the scan speed may be up to three times the conventional scan speed of a scanning method in which each pixel on the original image is read by three sensor elements. A further step to obtain a grey scale pixel value for each pixel on the original image is described below with reference to FIG. 6.

Figure 5A:
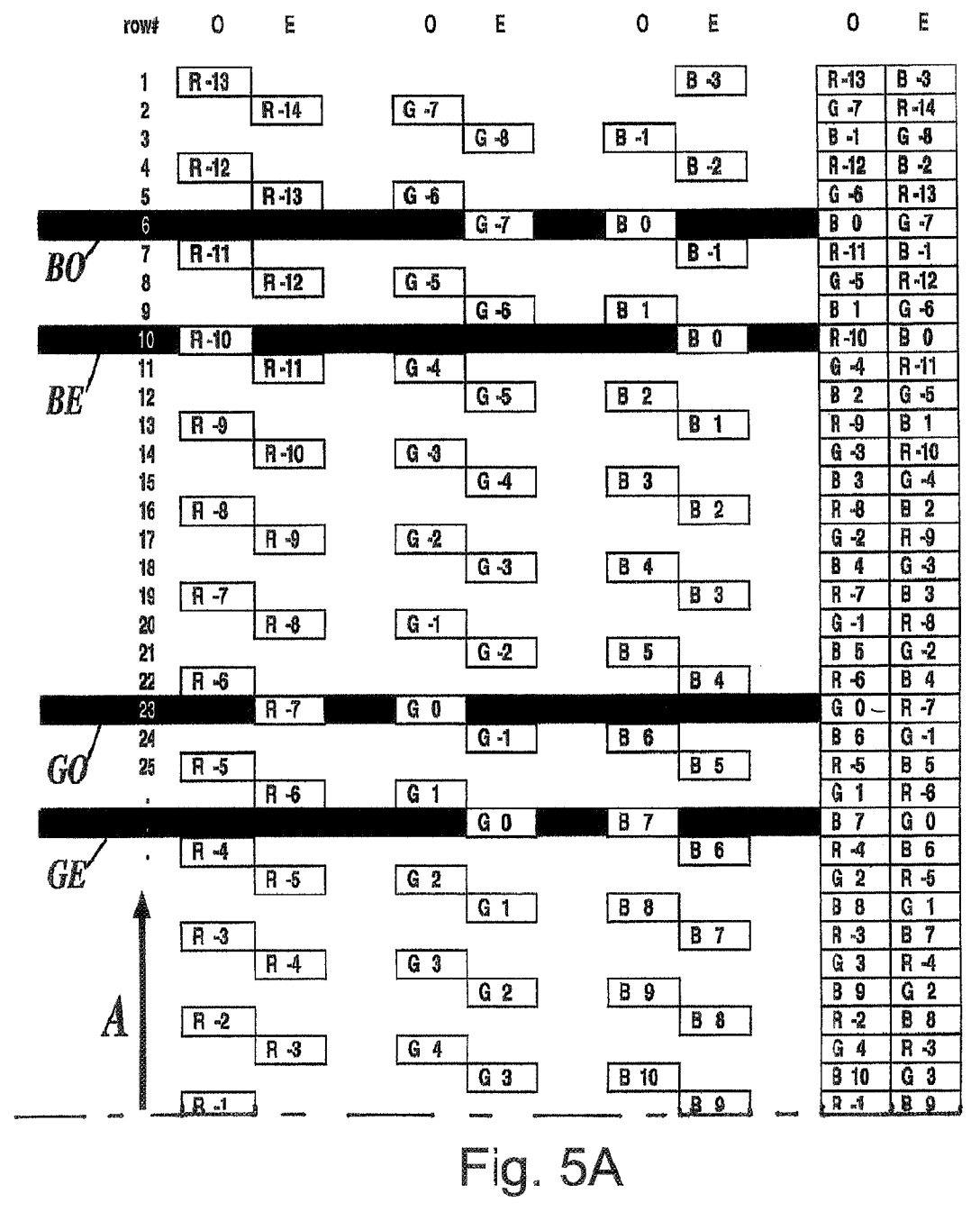
Figure 5B:
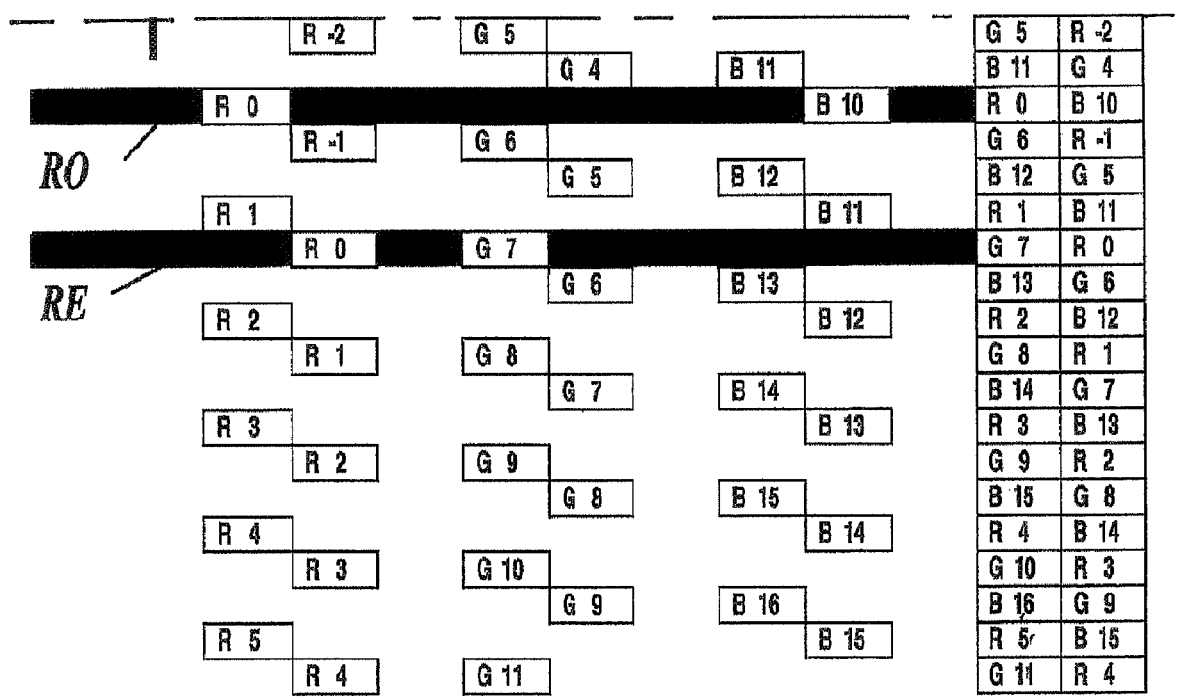
FIG. 5 illustrates a part of a further method of scanning in an embodiment of the present invention.

As an alternative to generating a pixel value of odd and even pixels of rows on the original image as illustrated with reference to FIG. 4, FIG. 5 illustrates that a light integration time of any sensor element within each operation cycle may be reduced. The way in which this is effected, is by providing a shutter 74 indicated in dashed lines in FIG. 3. Here, a shutter may be defined as a mechanism for limiting a light integration time of a sensor element within each cycle to a part of the cycle time, such as one third of the cycle time. Referring to FIG. 5, the shutter 74 e.g. shuts off the light path from the rows 5 and 7 to the sensor element BO while the sensor element BO passes over rows 5, 6, and 7, so that the sensor element BO receives the light only from the row 6 while passing over rows 5-7.

In the pair of columns of odd (O) and even (E) pixels shown at the right-hand side of FIG. 5, as an example, it is illustrated that a pixel value of an odd pixel of a row 6 on the image is generated on the basis of a signal of sensor element BO passing over rows 5, 6, and 7 in clock period 0, where a shutter limits the light integration time of the sensor element BO to the time that the sensor element passes over row 6. Similarly, a pixel value of an even pixel of row 6 on the image is generated on the basis of a signal of sensor element GE passing over rows 5, 6, and 7 in clock period −7, where a shutter limits the light integration time of the sensor element GE to the time that the sensor element passes over row 6. As another example, it is illustrated that a pixel value of an odd pixel of a row 14 on the original image is generated on the basis of a signal of sensor element GO passing over rows 13, 14, and 15 in clock period −3, where a shutter limits the light integration time of the sensor element GO to the time that the sensor element passes over row 14. Similarly, a pixel value of an even pixel of row 14 on the image is generated on the basis of a signal of sensor element RE passing over rows 13, 14, and 15 in clock period −10, where a shutter limits the light integration time of the sensor element RE to the time that the sensor element passes over row 14.

FIG. 6 repeats the columns O and E at the right-hand side of FIG. 5, but the explanation below is applicable to the columns O and E at the right-hand side of FIG. 4 also, mutatis mutandis. As illustrated by way of example in FIG. 6, a grey scale pixel value for the odd pixel in row 6 is generated by the pixel values from sensor BO in clock period 0, sensor GE in clock period −7, and sensor RO in clock period −11. Similarly, a grey scale pixel value for the even pixel in row 12 is generated by the pixel values from sensor RE in clock period −11, sensor BO in clock period 2, and sensor GE in clock period −5. A grey scale pixel value for the odd pixel in row 20 is generated by the pixel values from sensor GO in clock period −1, sensor RE in clock period −8, and sensor BO in clock period 5. A grey scale pixel value for the even pixel in row 24 is generated by the pixel values from sensor RE in clock period −7, sensor BO in clock period 6, and sensor GE in clock period −1.

If an interface in the processing of the data obtained by scanning has a limited bandwidth, only grey scale pixel values for odd pixels, or only grey scale pixel values for even pixels may be calculated at high scan speeds. This provides a relatively low resolution. A relatively low resolution, but with improved signal-to-noise ratio, may be obtained by calculating grey scale pixel values both for odd and even pixels, and performing an appropriate interpolation.

By using pixel values of three adjacent pixels, each pixel value from a different one of three sensor elements for different basic colors, and combining these pixel values (e.g. by equally weighing the signals from the respective sensor elements, which reduces artifacts at high scan speeds and low resolutions) to obtain a grey scale pixel value, a high speed scanning of a grey scale or color original may be used to produce an accurate grey scale image. An odd/even effect is highly reduced.

Other schemes of combining pixel values than the ones shown in FIG. 6 may be used. As an example, the grey scale pixel values of the even pixels of the rows may be generated by combining pixel values from the pixel itself, an adjacent odd pixel at the right-hand side in the next odd column, and an adjacent even pixel below in the next row, just as has been illustrated for the odd pixels of the rows.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of scanning an image on an original, comprising the steps of:
   using an optical sensor comprising sensor elements for each of a number of basic colors to generate pixel values of rows of pixels of the scanned image, wherein each pixel value represents an optical density of a pixel of the image, and wherein each of the sensor elements for each of the basic colors is used to generate grey scale pixel values representing substantially different parts of the image;
   using a first sensor element for each of the number of basic colors to generate pixel values of odd pixels of rows on the original;
   using a second sensor element for each of the number of basic colors to generate pixel values of even pixels of rows of the original; and
   for a pixel, generating a grey scale pixel value mainly on the basis of a pixel value of at least one of the first sensor elements and a pixel value of at least one of the second sensor elements for adjacent pixels.

2. The method of scanning of claim 1, further comprising the steps of:
   using sensor elements for three basic colors; and
   for each pixel, generating a grey scale pixel value mainly on the basis of three pixel values each from sensor elements for different basic colors, for three adjacent pixels.

3. The method of scanning of claim 2, further comprising the steps of:
   situating a first one of the three adjacent pixels immediately to the left or the right of a second one of the three adjacent pixels in a same row of pixels; and
   situating a third one of the three adjacent pixels immediately above or below the second one of the three adjacent pixels in a same column of pixels.

4. The method of scanning of claim 1, further comprising the steps of:
   using sensor elements for three basic colors; and
   generating each grey scale pixel value mainly on the basis of a pixel value of one first sensor element for one of the basic colors, and pixel values of two second sensor elements each for one of the other two basic colors.

5. The method of scanning of claim 1, further comprising the steps of:
   using sensor elements for three basic colors; and
   generating each grey scale pixel value mainly on the basis of a pixel value of one second sensor element for one of the basic colors, and pixel values of two first sensor elements each for one of the other two basic colors.

6. The method of scanning of claim 2, further comprising the step of equally weighting the three pixel values to obtain the grey scale pixel value.

7. A scanner, comprising:
   an optical sensor comprising sensor elements for each of a number of basic colors, the scanner being adapted to generate pixel values of a scanned image, wherein each pixel value represents an optical density of a pixel of the image,
   wherein the scanner is adapted to perform a method of scanning an image on an original, comprising the steps of:
   using an optical sensor comprising sensor elements for each of a number of basic colors to generate pixel values of rows of pixels of the scanned image, wherein each pixel value represents an optical density of a pixel of the image, and wherein each of the sensor elements for each of the basic colors is used to generate grey scale pixel values representing substantially different parts of the image;
   using a first sensor element for each of the number of basic colors to generate pixel values of odd pixels of rows on the original;
   using a second sensor element for each of the number of basic colors to generate pixel values of even pixels of rows of the original; and
   for a pixel, generating a grey scale pixel value mainly on the basis of a pixel value of at least one of the first sensor elements and a pixel value of at least one of the second sensor elements for adjacent pixels.

8. The scanner of claim 7, wherein the sensor elements are line arrays of CCDs.

9. The scanner of claim 7, wherein the sensor elements are adapted to operate periodically with a certain cycle time, and wherein the scanner further comprises a mechanism for limiting a light integration time of the sensor elements within each cycle to a time less than the cycle time.

10. The scanner of claim 9, wherein the mechanism is adapted to limit the light integration time of the sensor elements within each cycle to a time of not more than two thirds or one half or one third of the cycle time.

* * * * *